(12) United States Patent
Cai (10) Patent No.: US 9,848,304 B2
(45) Date of Patent: Dec. 19, 2017

(54) POSITIONING OF MOBILE DEVICE (71) Applicant: NOKIA SOLUTIONS AND NETWORKS OY, Espoo (FI)

(72) Inventor: Mao Cai, Chengdu (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/637,228

(22) Filed: Jun. 29, 2017

(65) Prior Publication Data
US 2017/0303091 A1 Oct. 19, 2017

Related U.S. Application Data

(62) Division of application No. 15/380,075, filed on Dec. 15, 2016.

(51) Int. Cl.
*H04W 4/02* (2009.01)
*H04W 64/00* (2009.01)
*H04W 88/02* (2009.01)

(52) U.S. Cl.
CPC ......... *H04W 4/025* (2013.01); *H04W 64/006* (2013.01); *H04W 88/02* (2013.01)

(58) Field of Classification Search
CPC .... H04W 4/025; H04W 64/006; H04W 88/02
See application file for complete search history.

(56) References Cited

U.S. PATENT DOCUMENTS 5,534,876 A * 7/1996 Erickson ............... G01S 5/0221
340/8.1

7,890,060 B2 * 2/2011 Lehtinen .................. G01S 5/00
340/539.1

(Continued)

FOREIGN PATENT DOCUMENTS

WO WO 2011/105946 A1 9/2011
WO WO 2015/135581 A1 9/2015
WO WO 2015/183965 A1 12/2015

OTHER PUBLICATIONS

Opinion on Patentability dated Aug. 29, 2016 corresponding to Finnish Patent Application No. 20155949.

(Continued)

*Primary Examiner* — Qun Shen
(74) *Attorney, Agent, or Firm* — Squire Patton Boggs (US) LLP (57) ABSTRACT

There is provided a solution for detecting and filtering inaccurate measurement results used for positioning a mobile device. A method comprises as performed by an apparatus: determining locations of a plurality of fixed positioning nodes; receiving a measurement report from a mobile device, the measurement report comprising a plurality of measurement values measured by the mobile device, wherein each measurement value comprises a reference signal time difference indicating a radio propagation time difference between the mobile device and two different positioning nodes; determining, on the basis of threshold comparison, that at least one of the plurality of measurement values is associated with an inaccurate measurement; modifying, autonomously by the apparatus, said at least one of the plurality of measurement values; and computing a location of the mobile device on the basis of a plurality of measurement values resulting from said modifying.

7 Claims, 6 Drawing Sheets

(56) References Cited

U.S. PATENT DOCUMENTS

| | | | |
|---|---|---|---|
| 2011/0207477 A1* | 8/2011 | Siomina | G01S 5/0278 |
| | | | 455/456.2 |
| 2013/0137454 A1* | 5/2013 | Cui | H04W 24/02 |
| | | | 455/456.1 |
| 2014/0087754 A1* | 3/2014 | Siomina | H04W 4/02 |
| | | | 455/456.1 |
| 2015/0018010 A1 | 1/2015 | Fischer | |
| 2015/0208198 A1 | 7/2015 | Duan | |
| 2015/0350850 A1* | 12/2015 | Edge | H04W 4/04 |
| | | | 455/456.1 |

OTHER PUBLICATIONS

International Search Report and Written Opinion dated Mar. 13, 2017 corresponding to International Patent Application No. PCT/FI2016/050872. Copy submitted in parent U.S. Appl. No. 15/380,075.

Sven Fischer, "Observed Time Difference of Arrival (OTDOA) Positioning in 3GPP LTE," Qualcomm, Jun. 6, 2014. Copy submitted in parent U.S. Appl. No. 15/380,075.

Binghao Li et al.: "3D DOPs for Positioning Applications Using Range Measurements," Scientific Research, Wireless Sensor Network, Oct. 2011, vol. 3, pp. 334-340. Copy submitted in parent U.S. Appl. No. 15/380,075.

3GPP TS 29.171 V13.0.0 (Sep. 2015), Technical Specification, 3rd Generation Partnership Project; Technical Specification Group Core Network and Terminals; Location Services (LCS); LCS Application Protocol (LCS-AP) between the Mobile Management Entity (MME) and Evolved Serving Mobile Location Centre (E-SMLC); SLs interface (Release 13), Sep. 2015, Copy submitted in parent U.S. Appl. No. 15/380,075.

3GPP TS 36.355 V12.4.0 (Mar. 2015), Technical Specification, 3rd Generation Partnership Project; Technical Specification Group Radio Access Network; Evolved Universal Terrestrial Radio Access (E-UTRA); LTE Positioning Protocol (LPP) (Release 12), Mar. 2015. Copy submitted in parent U.S. Appl. No. 15/380,075.

\* cited by examiner

POSITIONING OF MOBILE DEVICE

CROSS REFERENCE TO RELATED APPLICATION

This application is a divisional of U.S. patent application Ser. No. 15/380,075, filed on Dec. 15, 2016, and which claims priority from Finnish Patent Application No. 20155949, filed Dec. 15, 2015. The contents of these applications are hereby incorporated by reference.

BACKGROUND

Field

The invention relates to wireless communications and, in particular, to positioning of a mobile device of a cellular communication system, for example.

DETAILED DESCRIPTION OF THE RELATED ART

Observed Time Difference of Arrival (OTDOA) is a known positioning method based on measuring reference signals received by a mobile device from a plurality of fixed positioning nodes, e.g. access nodes of a wireless network. On the basis of the reference signals, a reference signal time difference observed by the mobile device with respect to the fixed positioning nodes may be calculated. The reference signal time difference may represent a difference in radio distances between the mobile device and a first access node and the mobile device and a second access node. At least two reference signal time difference values associated with different sets of access nodes may be used to estimate the location of the mobile device. In other words of saying, at least three measurements associated with difference access node may be needed for the estimation of the location of the mobile device.

Such positioning may be used for positioning the mobile device in locations where a global navigation satellite system (GNSS) such as Global Positioning System, Galileo, or GLONASS cannot provide a reliable positioning estimate.

For example, some modern cellular communication systems define a positioning protocol for positioning terminal devices of the system. An example of such a protocol is a LTE Positioning Protocol (LPP) of Long-Term Evolution cellular communication system. In the LPP, an OTDOA procedure works as follows: An evolved serving mobile location center (ESMLC) or a Secure User Plane Location Platform (SLP) requests, through an LPP layer, an OTDOA measurement. The request may be addressed to a terminal device and request the terminal device to perform a set of RSTD (Reference Signal Time Difference) measurements. Together with this request, the terminal device may receive assistance data. This assistance data may comprise a list of cells (eNodeBs) and PRS (Positioning Reference Signal) parameters of the cells. The terminal device may then perform the requested measurements. The measurements comprise estimating the exact time offsets between the PRS from different cells. Then it reports to the ESMLC these estimated time differences together with an estimate of the measurement quality or a measurement error. The ESMLC may then use these time difference estimates and the knowledge of the cells positions and transmit time offsets to estimate the position of the terminal device.

Measurement inaccuracies may degrade the performance of the conventional OTDOA algorithms. One cause of the inaccuracies may be multipath propagation of radio signals between an access node and the mobile device.

SUMMARY

According to an aspect, there is provided the subject matter of the independent claims. Some embodiments are defined in the dependent claims.

Claims 1-3 describe some embodiments of a method for filtering measurement values associated with positioning of a mobile device. According to another aspect, there is provided an apparatus comprising means for carrying out all the steps of a method according to any one of claims 1-3.

One or more examples of implementations are set forth in more detail in the accompanying drawings and the description below. Other features will be apparent from the description and drawings, and from the claims.

BRIEF DESCRIPTION OF DRAWINGS

In the following embodiments will be described in greater detail with reference to the attached drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Universal Mobile Telecommunication System (UMTS, 3G) based on basic wideband-code division multiple access (W-CDMA), high-speed packet access (HSPA), Long Term Evolution (LTE), LTE-Advanced, Wi-Fi (IEEE 802.11), Bluetooth®, and/or 5G cellular communication system. It is assumed that network architecture in 5G will be quite similar to that of the LTE-advanced. 5G is likely to use multiple-input-multiple-output (MIMO) multi-antenna transmission techniques, many more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum. The present embodiments are not, however, limited to these systems.

Some embodiments described herein relate to the LTE and LTE Positioning Protocol (LPP). The embodiments are not, however, restricted to the system given as an example but a person skilled in the art may apply the solution to other communication systems provided with necessary properties.

Figure 1:
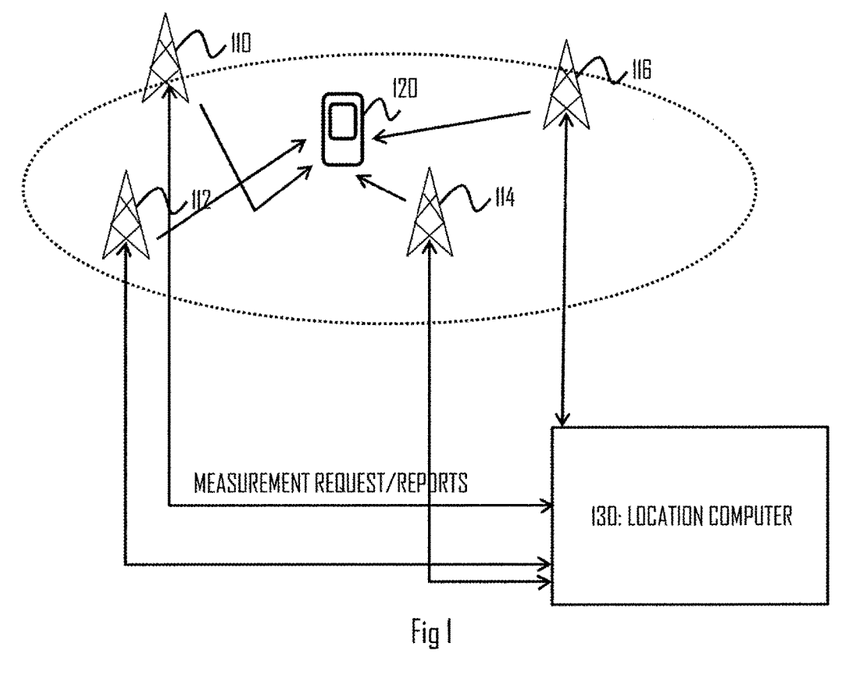
FIG. 1 illustrates a wireless communication system to which embodiments of the invention may be applied.

With the development of wireless networks, a mobile device 120 is typically in a communication range of several access nodes 110, 112, 114, 116. The access nodes may be base stations of a cellular communication system, such as the LTE or a 5G system, or they may be other wireless access nodes providing the mobile device 120 with access to a wireless network and to other networks such as the Internet. As described in the Background section, this feature has been used in positioning and tracking the location of the mobile device 120, and one solution for the positioning is the OTDOA. The access nodes 110 to 116 may be connected to a location computer apparatus 130 such as the above-described ESMLC executing the LPP. The location computer apparatus 130 may determine to request for the positioning of the terminal device and, as a consequence, transmit a positioning request to at least the mobile device 120 via at least one of the access nodes, e.g. the access node currently connecting the mobile device to the network of the access nodes. Upon receiving the request, the mobile device 120 may start measuring positioning reference signals received from the access nodes 110 to 116 it is able to detect, measure or estimate signal propagation times associated with each access node 110 to 116, and constructed a set of measurement values. The access nodes may synchronize their positioning reference signal transmissions or provide an offset of each un-synchronized signal such that the mobile device 120 is capable of estimating the radio propagation times associated with each positioning reference signal. Accordingly, the embodiments are applicable to both synchronous and asynchronous systems. Each measurement value may comprise a reference signal time difference (RSTD) value. The RSTD may characterize a difference in the estimated signal propagation times associated with two different access nodes. For example, RSTD(110, 112) may characterize a time difference between a first signal propagation time and a second signal propagation time, wherein the first signal propagation time is associated with a signal propagating from the access node 110 to the mobile device 120, and wherein the second signal propagation time is associated with a signal propagating from the access node 112 to the mobile device 120. The mobile device may generate the set of RSTD values for a plurality of pairs of access nodes. In the example of FIG. 1, the mobile device 120 may generate the following set of RSTD values: RSTD (110, 112), RSTD(110, 114), RSTD(110, 116), RSTD(112, 114), RSTD(112, 116), RSTD(114, 116). In reality, the number of generated RSTD values may be more than dozens, depending on the number of available reference signals. The mobile device 120 may also estimate a measurement error associated with the measurements of the signal propagation times. The mobile device may then generate a measurement report comprising the measurement values and the measurement error and transmit the measurement report to the location computer apparatus 130. Upon receiving the measurement report, the location computer apparatus 130 may execute the OTDOA algorithm and determine the location of the mobile device.

Figure 2:
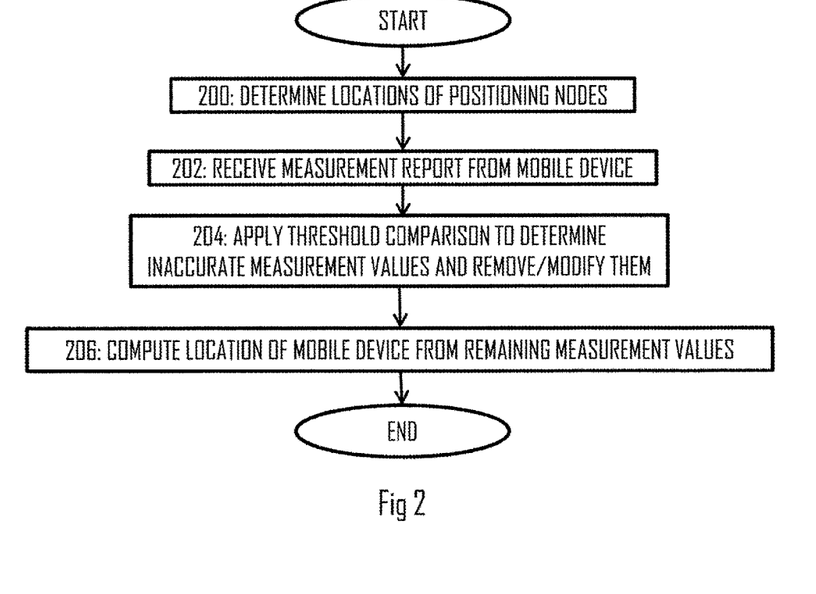
FIG. 2 illustrates a process for filtering measurement values in connection with positioning a mobile device according to an embodiment of the invention.

FIG. 2 illustrates an embodiment of a process for an apparatus to determine a location of a mobile device. The apparatus may be the location computer apparatus 130 or another positioning apparatus determining the location of the mobile device 120, for example. Referring to FIG. 2, the process comprises as performed by the apparatus: determining locations of a plurality of fixed positioning nodes 110 to 114 (block 200); receiving a measurement report from a mobile device (block 202), the measurement report comprising a plurality of measurement values measured by the mobile device, wherein each measurement value comprises a reference signal time difference indicating a radio propagation time difference between the mobile device and two different positioning nodes; determining (block 204), on the basis of threshold comparison carried out by the location computer apparatus, that at least one of the plurality of measurement values is associated with an inaccurate measurement; modifying, autonomously, said at least one of the plurality of measurement values (block 204); and computing (block 206) a location of the mobile device on the basis of a plurality of measurement values resulting from said modifying.

The embodiment of FIG. 2 uses the threshold comparison to modify the measurement results. In an embodiment, the modifying comprises removing at least one measurement result on the basis of the threshold comparison. In another embodiment, the modifying comprises modifying a value of at least one measurement result on the basis of said comparison. In yet another embodiment, the modifying comprises assigning to each measurement value a weight proportional to the accuracy of the measurement value, wherein the accuracy and the weight is determined on the basis of the threshold comparison. In yet another embodiment, the modifying comprises a plurality of said removal of at least one measurement value, the modification of at least one other measurement value, and the assigning the weight to each measurement value.

The embodiment of FIG. 2 may be used to estimate inaccurate measurement values during the execution of the positioning algorithm in the apparatus. Such run-time or dynamic detection of inaccurate measurement results improves the accuracy of the positioning the mobile device 120. The process of FIG. 2 may also be used in network planning, for example to determine sites for new access nodes so that the inaccuracies will be reduced.

In an embodiment, the positioning nodes 110 to 116 are access nodes of a wireless network configured to provide the mobile device 120 with wireless access to the wireless network. The access nodes may be access nodes or base stations of a cellular communication system such as the LTE, LTE-Advanced, or a 5G system.

Said feature of the apparatus autonomously modifying the measurement value(s) may refer to that the apparatus autonomously determines the inaccurate measurement value(s) and, makes the modification on the basis of that determination. The autonomous decision may be defined such that the apparatus does not need user input or another input that explicitly or implicitly pinpoints the measurement value(s) and instructs the apparatus to modify the measurement value(s).

Figure 3:
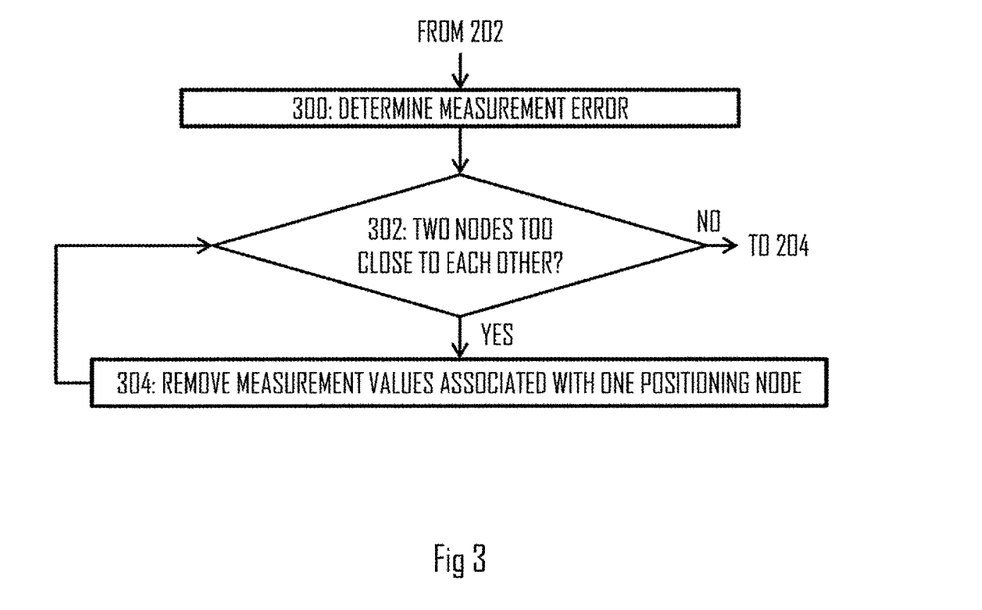
FIG. 3 illustrates a process for static filtering of measurement values according to an embodiment of the invention.

In an embodiment, the measurement values may be further modified on the basis of static measurement characteristics determined by the apparatus. Such static characteristics may refer to characteristics that remain the same over a plurality of positioning occasions. FIG. 3 illustrates such a process. The process of FIG. 3 may be executed as a part of the process of FIG. 2, as illustrated in FIG. 3. Referring to FIG. 3, the process comprises determining a measurement error associated with the measurement values. The measurement error may be determined and reported by the mobile device in connection with the measurement values, and the measurement error may be dependent on properties of the wireless network and/or on the properties of the mobile device 120. For example, the 3GPP specifications related to the LPP define the measurement error ranges: for intra-frequency RSTD values an error range proportional to ±50 to ±150 meters; for inter-frequency RSTD values an error range proportional to ±90 to ±210 meters. The mobile device may determine the measurement error according to state-of-the-art techniques, for example as in the LPP.

In block 302, the apparatus may compare distances between the positioning nodes 110 to 116 with the measurement error represented as a distance error. If the distance between two positioning nodes is smaller than the distance error in block 302, the process may proceed to block 304 in which measurement values associated with one of the two positioning nodes are removed from further processing, e.g. the removed measurement values are not taken into account when computing the position of the mobile device 120. Then, the process may return to block 302 for the processing of the next pair of positioning nodes. When it is determined in block 302 that there is no distance between the positioning nodes that is smaller than the distance error, or that the distances of the positioning nodes associated with the remaining measurement values are greater than the distance error, the process may proceed to block 204 for the threshold comparison.

In another embodiment, instead of removing the measurement values in block 304 the positioning node(s) may be configured not to transmit the positioning reference signals. As a consequence, the measurement results involving these positioning nodes are not available in the first place.

Another embodiment of the modification of the measurement results on the basis of the static characteristics is removing from the consideration those positioning nodes that do not support the positioning, e.g. do not transmit a positioning reference signal, positioning nodes whose location cannot be determined by the apparatus in step 200, and/or positioning nodes that otherwise are not applicable to the positioning of the mobile device.

Figure 4:
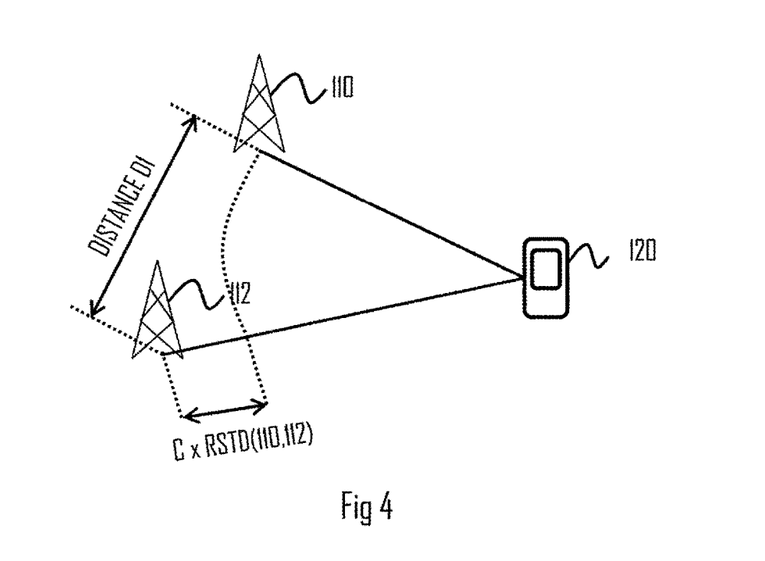
FIGS. 4 and 5 illustrate an embodiment of triangle filtering applied to the measurement values.

Let us now consider some embodiments of the threshold comparison with reference to FIGS. 4 to 11. The first embodiment illustrated in FIGS. 4 and 5 may be called a triangle filter. In short, the triangle filtering comprises determining that a measurement value indicates a reference signal time difference that is associated with a longer radio propagation distance than a distance between two positioning nodes associated with the measurement value. Let us elaborate this embodiment with reference to FIG. 4. Let us assume that the mobile device has received a first positioning reference signal from the positioning node 110 and a second positioning reference signal from the positioning node 112. The mobile device may then compute an RSTD from the reception timings of the first positioning reference signal and the second positioning reference signal. The RSTD(110, 112) represents the difference between radio propagation distances of a first distance from the positioning node 110 to the mobile device 120 and the second distance from the positioning node 112 to the mobile device 120. The apparatus may multiply the RSTD(110, 112) with the speed of light c to convert the RSTD(110, 112) to a distance value. If the RSTD(110, 112) is associated with a distance greater than the distance D1 between the positioning nodes 110 and 112, the apparatus may determine the RSTD value to be inaccurate. FIG. 4 illustrates a situation in case of line-of-sight propagation of the positioning reference signals and associated RSTD value which is significantly shorter with respect to the distance between the positioning nodes. In case one of the two positioning reference signal propagate to the mobile device via an indirect route through diffraction and/or reflection, the value of the RSTD value increases, and this threshold comparison based on a threshold determined from the distance between the positioning nodes is designed to detect inaccurate measurement values affected by such an indirect propagation of a positioning reference signal.

Figure 5:
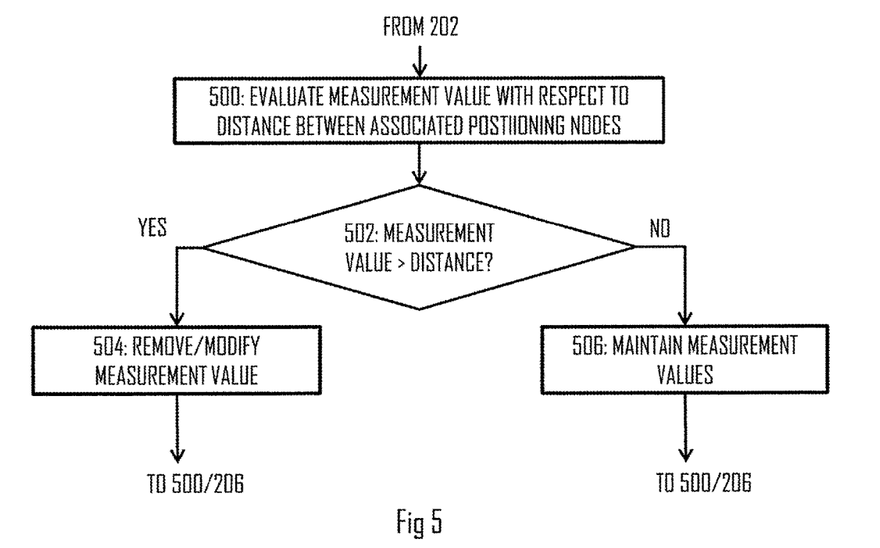

Referring to FIG. 5, the corresponding triangle filtering process comprises as performed by the apparatus: evaluating a measurement value with respect to the distance between positioning nodes associated with the measurement value (block 500). If the measurement value is associated with a distance greater than the distance between the positioning nodes in block 502, the process may proceed to block 504 in which the measurement value is modified or even removed. On the other hand, if the measurement value is associated with a distance lower than the distance between the positioning nodes, the measurement value may be maintained. In an embodiment, block 506 comprises assigning to the measurement value a weight indicating reliable accuracy of the measurement value. From the blocks 504, 506, the process may return to block 500 for the evaluation of a subsequent measurement value. If no more measurement values are left unprocessed, the process may proceed to block 206 for the estimation of the position of the mobile device 120.

The procedure of FIG. 5 may be used in estimating which one of the two positioning reference signals of the inaccurate measurement value causes the inaccuracy. As described above, the RSTD(110, 112) represents a time difference Ti(110) minus Ti(112), wherein Ti(x) represents a propagation time from the positioning node x to the mobile device. If the RSTD is higher than the distance between the positioning nodes, the Ti(110) causes the inaccuracy. This relationship is transitive in the sense that if Ti(110) is more inaccurate than Ti(112) and Ti(112) is more inaccurate than Ti(114), Ti(110) is also more inaccurate than Ti(114). Some embodiments described below (see FIG. 11 and associated description) utilize this transitive property.

In an embodiment of block 504, the measurement value processed in block 504 is removed from further analysis. In another embodiment, the measurement value processed in block 504 is replaced by another value. In an embodiment, the other value is proportional to the distance between the positioning nodes associated with the measurement value. e.g. an RSTD value corresponding to the distance between the positioning nodes plus the measurement error.

In the embodiment of the process of FIG. 5 where the measurement values are modified to new values, when all the available measurement values have been processed, a new iteration of the process may be carried out with the modified values. The need for a new iteration may be determine on the basis of the number of executions of block 504. For example, if the block 504 is not used at all during an iteration of the process, the process may end the iterations and proceed to block 206. On the other hand, if the block 504 is carried out at least once during the iteration, a new iteration may be applied.

Figure 6:
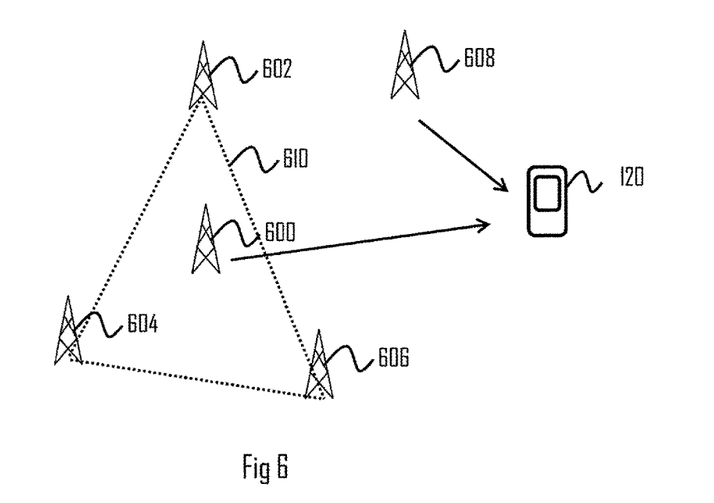
FIGS. 6 and 7 illustrate an embodiment of surrounding node set filtering applied to the measurement values.
Figure 7:
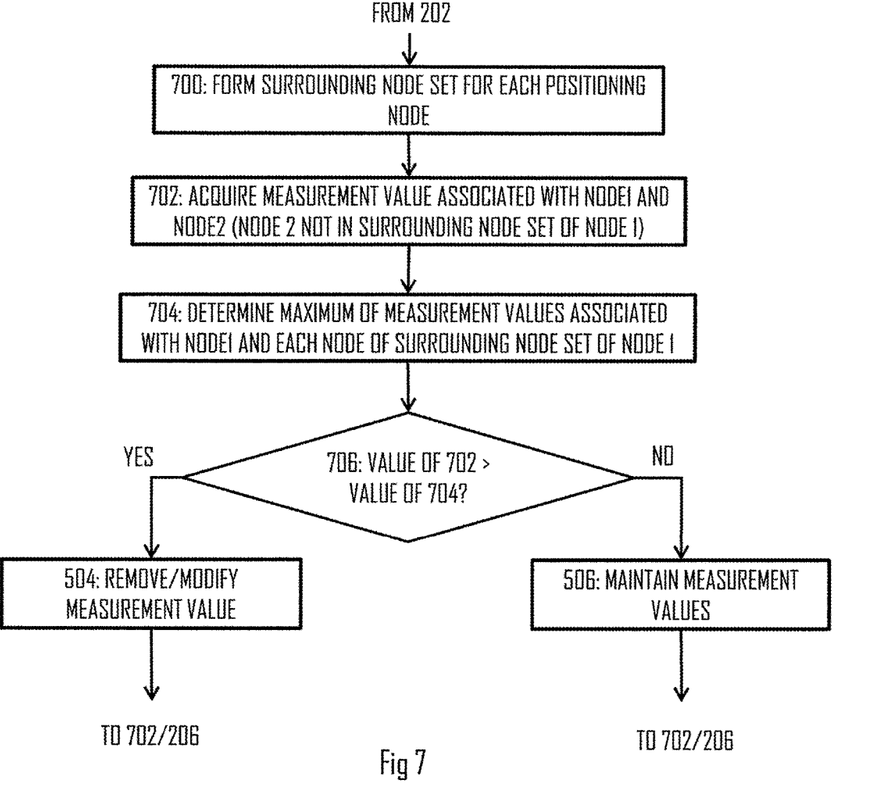

FIGS. 6 and 7 illustrate an embodiment which may be called a surrounding node set filter. Referring to FIGS. 6 and 7, the process of FIG. 7 may comprise a preparation step 700 in which a surrounding node set is formed for each positioning node. Block 700 may be executed before block 200 or after block 200. Referring to FIG. 6 illustrating a surrounding node set for a positioning node 600, the surrounding cell set of a positioning node may comprise a set of positioning nodes that together surround the positioning node 600. The positioning nodes 602, 604, 606 of the surrounding node set may be selected such that the positioning node 600 is located inside an area whose edges are defined by lines drawn between the positioning nodes 602 to 606 of the surrounding node set. For example, if the surrounding node set consists of three positioning nodes, the positioning node for which the surrounding node set is formed may be located inside a triangle defined by the locations of the positioning nodes of the surrounding node set. For another example, if the surrounding node set consists of four positioning nodes, the positioning node for which the surrounding node set is formed may be located inside a quadrangle defined by the locations of the positioning nodes of the surrounding node set.

In an embodiment, a plurality of surrounding node sets is formed for at least one positioning node.

From the properties of the surrounding node set, it is evident that a distance between the mobile device 120 and the positioning node 600 is shorter than a maximum of distances from each positioning node 602, 604, 606 of the surrounding node set to the mobile device 120. Accordingly, it can be derived that a measurement value RSTD(600, 608) associated with the positioning node 600 and another positioning node 608 that is not part of the surrounding node set is smaller than a maximum of the measurement values RSTD(602, 608), RSTD(604, 608), RSTD (606, 608) plus the measurement error. Accordingly, if the measurement value RSTD(600, 608) is higher than the maximum of the measurement values RSTD(602, 608), RSTD(604, 608), RSTD (606, 608) plus the measurement error, the measurement value RSTD(600, 608) may be considered inaccurate.

Referring to FIG. 7, the process may comprise acquiring a measurement value associated with a first positioning node and a second positioning node (block 702), wherein the second positioning node is not part of the surrounding node set of the first positioning node. Creating the plurality of surrounding node sets for the first positioning node from different combinations of the surrounding nodes enables the use of measurement values of those positioning nodes that are included in one or more but not all the surrounding node sets.

In block 704, the apparatus may determine the maximum of the measurement values associated with the first positioning node and each node of the selected surrounding node set of the first positioning node. In block 706, the apparatus may compare the measurement value acquired in block 702 with the measurement value determined as the maximum in block 704. If the measurement value of block 702 is higher than the maximum measurement value, the process may proceed to block 504, and block 504 may be executed in the above-described manner. Accordingly, the measurement value of block 702 may be determined to be inaccurate and need removal or modification. In a case of modifying the measurement value, the value of the measurement value may be replaced by a value proportional to the maximum value determined in block 704, e.g. the maximum value plus the measurement error. If the measurement value of block 702 is lower than the maximum measurement value, the process may proceed to block 506, and block 506 may be executed in the above-described manner. Accordingly, the measurement value of block 702 may be considered to be accurate.

From blocks 504, 506, the process may return to block 702 for the acquisition of the subsequent measurement value or, if no further measurement values are available for processing, the process may proceed to the positioning of the mobile device in block 206.

In the embodiment of the process of FIG. 7 where the measurement values are modified to new values, when all the available measurement values have been processed, a new iteration of the process may be carried out with the modified values. The need for a new iteration may be determine on the basis of the number of executions of block 504. For example, if the block 504 is not used at all during an iteration of the process, the process may end the iterations and proceed to block 206. On the other hand, if the block 504 is carried out at least once during the iteration, a new iteration may be applied.

In an embodiment of FIGS. 6 and 7, a further criterion may be applied when the mobile device 120 is outside the area drawn by the edges between the locations of the surrounding node set. In such a case, the distance between the mobile device 120 and the positioning node 600 is longer than a minimum of distances from each positioning node 602, 604, 606 of the surrounding node set to the mobile device 120. Accordingly, it can be derived that a measurement value RSTD(600, 608) associated with the positioning node 600 and another positioning node 608 that is not part of the surrounding node set is larger than a minimum of the measurement values RSTD(602, 608), RSTD(604, 608), RSTD (606, 608) minus the measurement error. Accordingly, if the measurement value RSTD(600, 608) is lower than the minimum of the measurement values RSTD(602, 608), RSTD(604, 608), RSTD (606, 608) minus the measurement error, the measurement value RSTD(600, 608) may be considered inaccurate.

Figure 8:
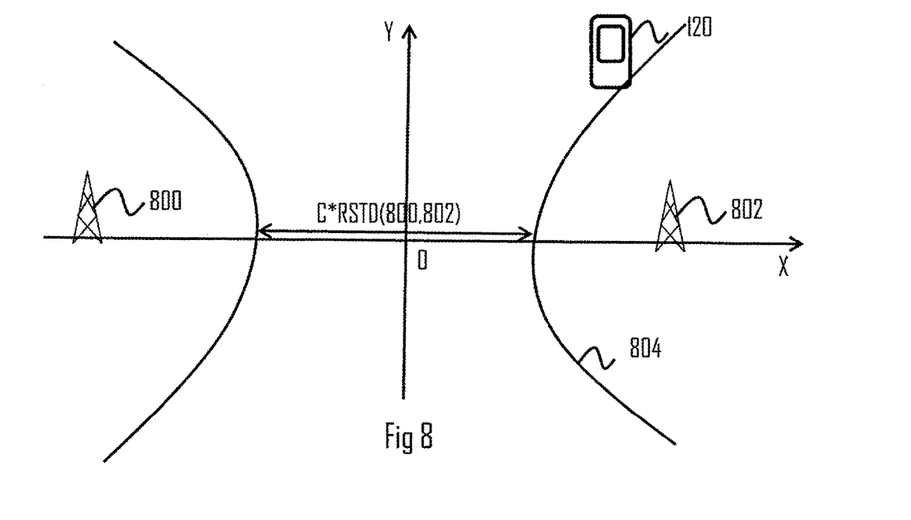
FIGS. 8, 9, and 10 illustrate an embodiment of grid filtering applied to the measurement values.
Figure 9:
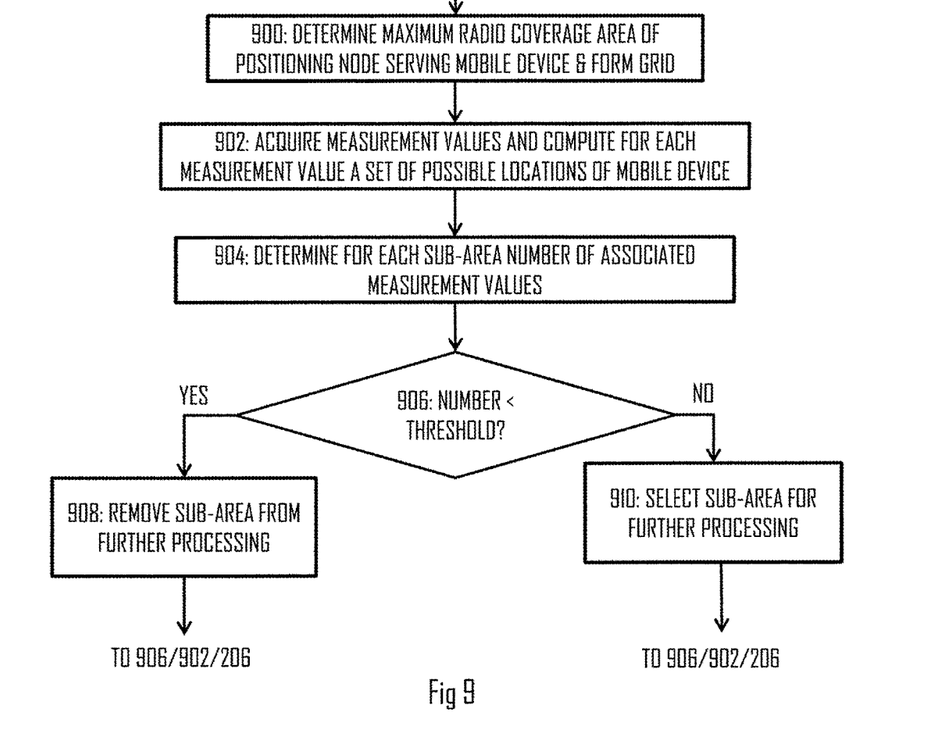
Figure 10:
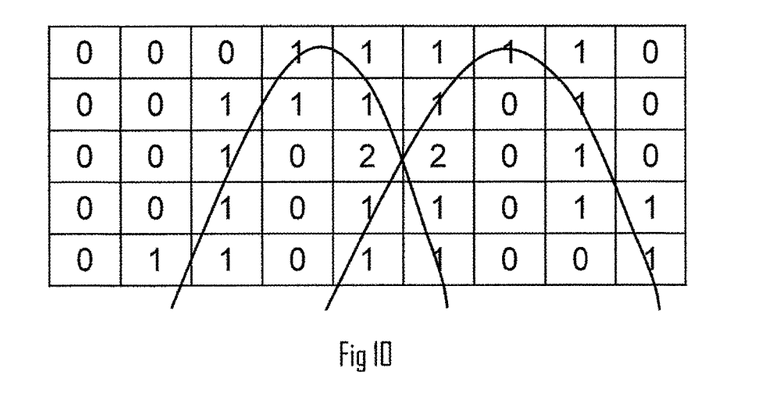

FIGS. 8 to 10 illustrate an embodiment where the measurement values are classified or filtered on the basis of a location of the mobile device 120 indicated by each measurement value. When a measurement value is a RSTD value, it represents a set of possible locations for the mobile device 120. The set of possible locations may form a curve of locations matched with the reference signal timings measured by the mobile device from the two positioning nodes associated with the measurement value. Accordingly, the curve of possible locations may define the set of possible locations associated with the RSTD value. A plurality of measurement values may be used to determine the real location of the mobile device 120 amongst the set of possible locations. The real location may be determined to be a location where a plurality of sets of locations, each associated with a different measurement value, intersects. Accordingly, the same location is indicated by a plurality of measurement values.

Let us define a new coordinate system: assume that a location of a positioning node 800 is at $(x_{800}, y_{800})$ in xy-coordinates and $(-d_{(800,802)}/2, 0)$ in XY coordinates illustrated in FIG. 8. Similarly, a location of a positioning node 802 is at $(x_{802}, y_{802})$ in the xy-coordinates and $(d_{(800,802)}/2, 0)$ in the XY coordinates illustrated in FIG. 8. d is the distance between the nodes 800, 802. The set of locations of a measurement value associated with both nodes 800, 802 is represented as a hyperbola 804 in FIG. 8. The hyperbola can be expressed in terms of the measurement value as:

$$X^2 \Big/ \left(\frac{C*RSTD_{(800,802)}}{2}\right)^2 - \qquad (1)$$

$$Y^2 \Big/ \sqrt{\left(\frac{d_{(800,802)}}{2}\right)^2 - \left(\frac{C*RSTD_{(800,802)}}{2}\right)^2} = 1$$

where the measurement value is represented by RSTD(800, 802). Only one side of the hyperbola 804 is actually used in the computation, and the used side may be determined as:

$$\begin{cases} X = \sqrt{\left(\dfrac{Y^2}{\sqrt{\left(\dfrac{d_{(800,802)}}{2}\right)^2 - \left(\dfrac{C*RTSD_{(800,802)}}{2}\right)^2}} + 1\right) \times \left(\dfrac{C*RTSD_{(800,802)}}{2}\right)^2}, RSTD_{(800,802)} > 0 \\ \\ X = -\sqrt{\left(\dfrac{Y^2}{\sqrt{\left(\dfrac{d_{(800,802)}}{2}\right)^2 - \left(\dfrac{C*RTSD_{(800,802)}}{2}\right)^2}} + 1\right) \times \left(\dfrac{C*RTSD_{(800,802)}}{2}\right)^2}, RSTD_{(800,802)} < 0 \end{cases} \quad (2)$$

where C represents the speed of light. If RSTD(800,802)>0, X>0; if RSTD(800,802)<0, X<0. As a consequence, only a half of the hyperbola is used. The relationship between (x,y) in xy coordinates and (X,Y) in the XY coordinates is:

$$\begin{cases} X = (x - (x_{i2} + x_{i1})/2)\cos\theta + (y - (y_{i2} + y_{i1})/2)\sin\theta \\ Y = (y - (y_{i2} + y_{i1})/2)\cos\theta - (x - (x_{i2} + x_{i1})/2)\sin\theta \\ \sin\theta = (y_{i2} - y_{i1})/d_{(i1,i2)} \\ \cos\theta = (x_{i2} - x_{i1})/d_{(i1,i2)} \end{cases}$$

When RSTD=0, the curve becomes perpendicular bisector line:

$$\left(x - \dfrac{x_{800} + x_{802}}{2}\right) \Big/ \left(y - \dfrac{y_{800} + y_{802}}{2}\right) = y_{800} - y_{802} / x_{800} - x_{802} \quad (3)$$

This embodiment employs a feature that, since a non-zero measurement value can be expressed by a hyperbola curve or perpendicular bisector line defining the set of possible locations of the mobile device for the measurement value, when four vertices of a rectangle stays on different side of the curve or line, the curve or line must travel inside the rectangle. All accurate measurement values should define curves and/or lines that intersect on the real location of the mobile device 120. The same principle may be applied to geometric forms other than the rectangle as well.

FIG. 9 illustrates a grid filtering process that employs the above-described feature to determine the inaccurate measurement results. Referring to FIG. 9, the process may comprise an initialization step 900 which may be carried out even before block 200. In block 900, the apparatus determines a maximum coverage area of each positioning node and divides the maximum coverage area to an initial grid of sub-areas. FIG. 10 illustrates an example of a maximum coverage area of a positioning node as divided into the sub-areas. The maximum coverage area is in this example divided into 45 sub-areas in the form of a grid. This initial rectangle may be computed according to a criterion other than the maximum coverage area of the positioning node, e.g. it may be a sub-area within the maximum coverage area. One option for the initial rectangle may be a plausible area where the mobile device 120 is located with a certain probability. The number of sub-areas may be higher than one. In an embodiment, the sub-area may have dimensions greater than the measurement error represented in terms of a measurement error distance. Each vertex of each sub-area may be represented in the XY coordinates to make it comparable with the measurement value in the XY coordinates. Now, remember that the measurement value RSTD (800, 802) is represented as:

if $RSTD_{(800,802)} > 0$, $f(X, Y) =$ $$X - \sqrt{\left(Y^2 \Big/ \sqrt{\left(\dfrac{d_{(800,802)}}{2}\right)^2 - \left(\dfrac{C*RSTD_{(800,802)}}{2}\right)^2} + 1\right) \times \left(\dfrac{C*RSTD_{(800,802)}}{2}\right)^2};$$

if $RSTD_{(800,802)} < 0$, $f(X, Y) = X +$ $$\sqrt{\left(Y^2 \Big/ \sqrt{\left(\dfrac{d_{(800,802)}}{2}\right)^2 - \left(\dfrac{C*RSTD_{(800,802)}}{2}\right)^2} + 1\right) \times \left(\dfrac{C*RSTD_{(800,802)}}{2}\right)^2};$$

if $RSTD_{(800,802)} = 0$, $f(X, Y) =$ $$\left(\left(x - \dfrac{x_{800} + x_{802}}{2}\right) \Big/ \left(y - \dfrac{y_{800} + y_{802}}{2}\right)\right) - (y_{800} - y_{802} / x_{800} - x_{802}), \text{ and}$$

$f(X, Y) = X$

In block 902, this representation of the measurement value RSTD(800,802) may be generated, and the curve defines the set of possible locations for the mobile device in view of the measurement value RSTD(800, 802). Similar representation may be carried out for all the measurement values available in block 902.

In block 904, the XY-coordinate of each vertex of each sub-area may be inserted into the representation of the measurement value and the following determination may be made for each measurement value with respect to each sub-area: if $f(X_{s,1}, Y_{s,1}) > 0$ and $f(X_{s,2}, Y_{s,2}) > 0$ and $f(X_{s,3}, Y_{s,3}) > 0$ and $f(X_{s,4}, Y_{s,4}) > 0$ or if $f(X_{s,1}, Y_{s,1}) < 0$ and $f(X_{s,2}, Y_{s,2}) < 0$ and $f(X_{s,3}, Y_{s,3}) < 0$ and $f(X_{s,4}, Y_{s,4}) < 0$, the RSTD curve does not travel through the sub-area. Otherwise, the RSTD curve travels through the sub-area. s refers to an index of the sub-area and 1, 2, 3, and 4 define different vertices of the sub-area s. When a function or a curve of the measurement value is determined to travel through the sub-area, a weight of the sub-area may be incremented. FIG. 10 illustrates the curves of only two measurement values for the sake of simplicity, and the number in each sub-area represents the weight of the sub-area, e.g. the number of curves travelling through the sub-area. If the function or curve of the measurement value is determined not to travel through a sub-area, the incrementing may be omitted or a smaller weight may be added to the sub-area.

The sub-areas may be processed in parallel processing in a processor of the apparatus. When all the measurement values for all the sub-areas have been processed, the result for each sub-area may be defined as a weight proportional to a number of measurement values indicating that the sub-area is a potential location of the mobile device 120. The more measurement values indicate that a certain sub-area is a potential location of the mobile device 120, the more reliable are those measurement values. This feature may be used when generating a threshold that is used to pinpoint inaccurate measurement results.

In an embodiment, the threshold is an median weight computed over the weights of all the sub-areas. In another embodiment, the threshold is an average weight.

In block 906, the weight of a sub-area is compared with the threshold. If the weight of the sub-area is higher than the threshold, the process may proceed to block 910 in which the sub-area is selected for further processing. On the other hand, if the weight of the sub-area is lower than the threshold, the process may proceed to block 908 in which the sub-area is not selected for further processing.

From block 908/910, the process may return to block 906 for the processing of the next sub-area, to block 902 for the next iteration of the process with a new initial coverage area, or to block 206 for the positioning of the mobile device.

With respect to the next iteration, a new initial coverage area may be defined. The new initial coverage area may be created from a combination of sub-areas selected in block 910. In an embodiment, the new initial coverage area is also a rectangle so, if the selected sub-areas of the grid form an asymmetric form a rectangle covering all the selected sub-areas and, optionally, some unselected areas may be formed. At this instance, at least some or even all the measurement values determined not to cross the new initial coverage area on the basis of the processing of block 904 may be omitted from further evaluation, thus providing a reduced set of measurement values. In an embodiment, the new initial sub-area defines a coverage that is a half of the coverage of the previous iteration.

In an embodiment, the new initial coverage area is smaller than in the previous iteration. If the new initial coverage area cannot be created such that the area becomes smaller than in the previous iteration, the process may proceed to block 206. This may occur, for example, when sub-areas of opposite corners of an initial coverage area are selected for the next iteration. If the sub-areas of the new initial coverage area become smaller than the measurement error, the process may proceed to block 206. The measurement error may thus determine the minimum dimensions of the sub-areas. The measurement error ranges are described above with respect to inter-frequency and intra-frequency RSTD values. Another criterion for proceeding to block 206 may be reduction of the new initial sub-area to a predetermined size. The size may be defined in terms of satisfactory positioning accuracy. If it is considered that the new initial sub-area is small enough for a satisfactory positioning accuracy, the process may proceed to block 206.

When block 206 is executed as a result of the grid filtering, the location of the mobile device 120 may be determined to be at a location defined by the sub-area(s) selected in block 910 in the last iteration. As a consequence, the grid filtering may be considered as a method for removing inaccurate measurement results and a method for calculating the location of the mobile device 120.

Above, the grid filtering has been discussed in connection with RSTD values that provide the curve of possible locations of the mobile device as the hyperbola. The grid filtering is applicable to other types of measurement values, too. For example, measurements based on round trip time or time-of-arrival measurements provide the curve in the form of a circle where the circles formed by accurate measurements intersect at the location of the mobile device.

The grid filtering determines the location where the accurate measurements intersect by gradually reducing the grid and, meanwhile, filters out inaccurate measurements.

Figure 11:
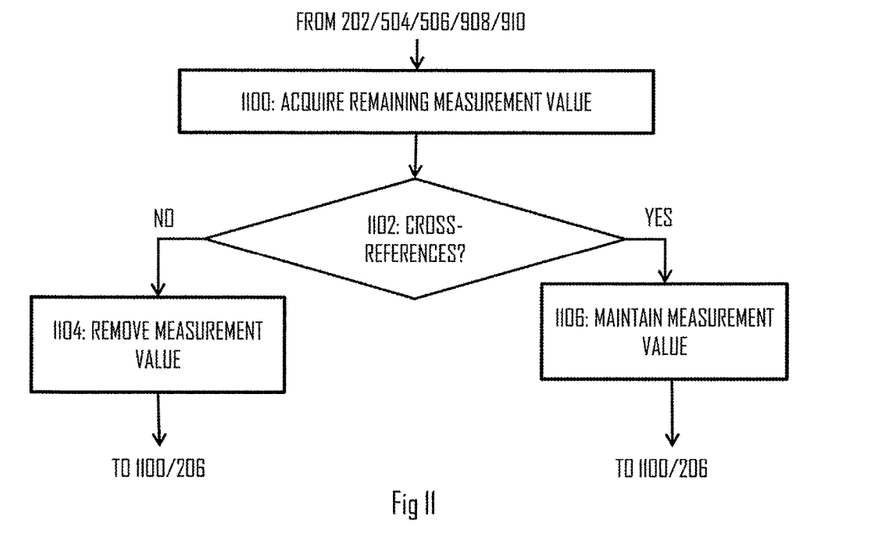
FIG. 11 illustrates yet another embodiment of threshold-based filtering applied to the measurement values.

FIG. 11 illustrates yet another embodiment of the threshold comparison. The threshold comparison of FIG. 11 may be called cross-reference filtering. The cross-reference filtering may be carried out in connection with any one or more of the above-described embodiments, and it may be used to detect remaining inaccurate measurement values. The embodiment of FIG. 11 may be used in connection with embodiments that remove the inaccurate measurement values from further analysis. For some reason, the above-described filtering methods may not be capable of removing all the inaccurate measurement results and, therefore, the post-processing of this embodiment may further improve the accuracy of the positioning.

The process may comprise determining, amongst the remaining set of measurement values, one or more measurement values not having a certain number of cross-referencing other measurement values amongst the remaining set of measurement values. The certain number may define a threshold for the threshold comparison. Referring to FIG. 11, the apparatus may acquire in block 1100 a remaining measurement value. If the measurement value is determined to comprise a cross-referencing other measurement value in the remaining set of measurement values in block 1102, the process may proceed to block 1106 where the measurement value is maintained. On the other hand, if the measurement value has no cross-referencing measurement value, the process may proceed to block 1104 in which the measurement value is removed as an inaccurate measurement value. With respect to the cross-referencing measurement values, it may be determined in block 1102 that a cross-referencing value is found if there is found another measurement value that is associated with the same positioning node or nodes. For example, if RSTD(110,112) and RSTD(112,114) is being evaluated in block 1102, the process may proceed to block 1106 if RSTD(110,114) is also found in the set of remaining measurement values. The analysis may be expanded to other cross-referencing sets of measurement values. For example, if RSTD(110,112) is being evaluated in block 1102, the process may proceed to block 1106 if RSTD(110,114) and RSTD(112,114) are also found in the set of remaining measurement values. Accordingly, a criterion for finding the cross-reference in block 1102 and proceeding to block 1106 may be that an enclosed set of measurement values is discovered. The enclosed set may be defined such that the remaining measurement values include all the measurement values associated with a certain set of positioning nodes. There may be provided different embodiments for defining the number of positioning nodes in the set, e.g. two nodes setting a requirement to find two measurement values, three nodes setting a requirement to find six measurement values, four nodes setting a requirement to find 12 measurement values, etc. In an embodiment, if a measurement value RSTD(110, 112) is being evaluated and its reverse measurement value RSTD(112,110) is missing, the process may always proceed to block 1104.

In an embodiment, the positioning nodes involved in any one of the remaining measurement values may be selected and ordered by the number of measurement values involving each positioning node. Then, for each subset of positioning nodes involved in the same number of measurement values, the following filtering may be carried out: if the "number of positioning nodes in the subset minus one" is not equal to the number of measurement values involving each of the positioning nodes, the measurement values involving the positioning nodes of the subset may be processed in block 1104. This may be described such that the subset does not then comprise fully cross-referencing measurement values, e.g. it may comprise measurement values RSTD(110,112) and RSTD(112,114) but not RSTD(110,114). If the "number of positioning nodes in the subset minus one" is equal to the number of measurement values involving each of the positioning nodes, the subset may be considered to include measurement values that fully cross-refer to each other. Accordingly, the measurement values may be processed in block 1106. It may be further decided for each pair of two positioning nodes in the subset whether they have corresponding accurate measurements values resulting from any one or more of the above-described filtering processes. If so, the subset of positioning nodes may be determined to provide accurate measurement values and should be processed in block 1106. If there are multiple independent subsets, choose the independent subset with the highest number of RSTD values. The independent subset may have Embodiments employing the dynamic detection of the inaccurate measurement values described above in connection with FIGS. 4 to 11 may be considered to have the common feature of defining one or more threshold values that enable detection of measurement results involving the indirect radio propagation of the positioning reference signal from a positioning node to the mobile device. The indirect propagation causes increase in the RSTD value and, thus, setting the threshold to the appropriate level, this high RSTD values may be filtered through removal, modification of their values, or assigning a low reliability indicator. Above, some embodiments for setting the threshold level that enable filtering of RSTD values exceeding the threshold are described. For example, the triangle filtering and the surrounding node set filter employ the topology of the positioning nodes or locations of the positioning nodes for setting the threshold. Some other described embodiments employ the error transition or the prior removal of some measurement values.

As described above, the process of FIG. 2 may be supplemented by any one or more of the embodiments described in connection with FIGS. 3 to 11. Many of the described embodiments are mutually independent processes but provide a synergistic effect of further improving the positioning accuracy by providing a different aspect to the threshold comparison.

Figure 12:
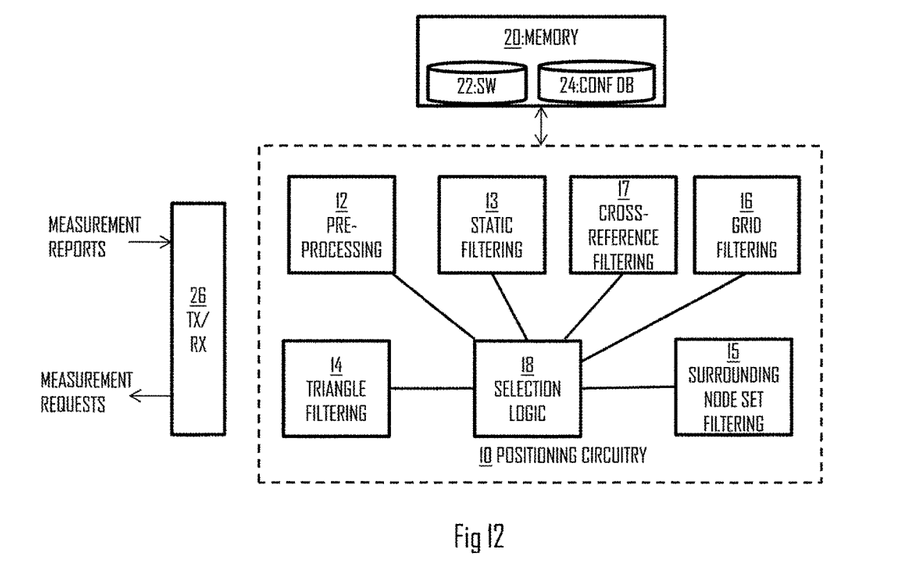
FIG. 12 illustrates an embodiment of an apparatus configured to carry out the filtering of the measurement values according to any one of the embodiments described herein.

FIG. 12 illustrates an embodiment of the apparatus carrying out any one of the processes described above in connection with FIGS. 2 to 11. The apparatus may be defined as a positioning computer providing a positioning service for determining a location of one or more mobile devices 120. The apparatus may be realized in a server computer, or it may be provided by a plurality of physical server computers. The apparatus may provide the positioning service as a cloud service, wherein the service may be virtualized and distributed amongst the plurality of different physical server computers. The apparatus may be comprised in the same network with the positioning nodes, e.g. in a radio access network or in a core network of a cellular communication system. In other embodiments, the apparatus belongs to a different network than a network of the positioning nodes, and the positioning nodes and the mobile device may communicate with the apparatus over the network of the positioning nodes and through the Internet, for example.

The apparatus may comprise a positioning circuitry 10 such as at least one processor, and at least one memory 20 including a computer program code (software) 22 wherein the at least one memory and the computer program code (software) are configured, with the at least one processor, to cause the apparatus to carry out any one of the embodiments described above.

The memory 20 may be implemented using any suitable data storage technology, such as semiconductor based memory devices, flash memory, magnetic memory devices and systems, optical memory devices and systems, fixed memory and removable memory. The memory may comprise a configuration database 24 for storing configuration data for the execution of the location computation. For example, the configuration database 24 may store the information resulting from the static filtering of FIG. 3 or the preliminary steps 700, 900. The configuration database 24 may also store previous locations of the mobile devices.

The apparatus may further comprise a communication interface (TX/RX) 26 comprising hardware and/or software for realizing communication connectivity according to one or more communication protocols. The communication interface 26 may provide the apparatus with communication capabilities to communicate with the positioning nodes and/or the mobile devices, for example. In an embodiment, the communication interface provides a connection to a network of the cellular communication system. In another embodiment, the communication interface provides a connection to the Internet. The communication interface 26 may comprise standard well-known components such as an amplifier, filter, frequency-converter, (de)modulator, and encoder/decoder circuitries.

In an embodiment of FIG. 12, at least some of the functionalities of the apparatus may be shared between two physically separate devices, forming one operational entity. Such a property is known in connection with cloud servers, wherein certain functionality may be distributed amongst a plurality of physical entities. Therefore, the apparatus may be seen to depict the operational entity comprising one or more physically separate devices for executing at least some of the described processes. The devices may communicate with each other over a computer network.

The positioning circuitry 10 may be configured to communicate with the positioning nodes, the mobile devices, and/or other devices through the communication interface 26. The positioning circuitry may output, as a result of an event detected in the positioning circuitry 10, a request for the mobile device and/or the positioning nodes to carry out the measurements. As a response, the positioning circuitry may receive one or more measurement reports comprising the measurement values for use in the positioning of the mobile device. The event may be a reception of a positioning request from another device. The event may be a periodic event or a time-based event, e.g. lapse of a certain time period from the latest positioning of the mobile device.

The positioning circuitry 10 may comprise, as sub-circuitries, one or more of the following modules: a pre-processing module 12, a static filtering module 13, a triangle filtering module 14, a surrounding node set filtering module 15, a grid filtering module 16, a cross-reference filtering module 17, and a selection logic 18 configured to control the execution of the mobiles.

The pre-processing module 12 may be configured to carry out any pre-processing that may be carried out before the reception of the measurement values. The pre-processing module 12 may carry out blocks 700 and/or 900, for example.

The static filtering module may be configured to carry out the process of FIG. 3. The triangle filtering module 14 may be configured to carry out the process of FIG. 5. The surrounding node set filtering module 15 may be configured to carry out the process of FIG. 7. The grid filtering module 16 may be configured to carry out the process of FIG. 9. The cross-reference filtering module may be configured to carry out the process of FIG. 11.

The selection logic circuitry 18 may trigger the operation of each module. For example, upon receiving the measurement report associated with the mobile device, the selection logic circuitry 18 may determine a filtering to be applied first. The selection logic circuitry 18 may then select, according to a determined criterion, one of the modules 14 to 17, and output a triggering signal to the selected module. The selected module may then filter the measurement values according to the corresponding filtering process. Thereafter, the module may report the resulting measurement values to the selection logic circuitry 18. The selection logic circuitry may then analyze the report, e.g. the number of remaining measurement values or the number of measurement values classified as reliable, unreliable, or unclassified, and determine whether or not to apply further filtering. Upon determining to carry out further filtering of the measurement values, the selection logic circuitry 18 may trigger another module 14 to 17 to carry out further filtering. In this manner, the selection logic circuitry may control further processing of the measurement values until it determines that no more filtering is needed. The selection logic circuitry may then trigger a module (not shown) of the positioning circuitry computing the location of the mobile device, and the final location of the mobile device may be computed.

With respect to the pre-processing circuitry 12 or static filtering circuitry 13, the selection logic circuitry 18 may trigger the execution of those modules whenever static measurement characteristics change. For example, when a new positioning node is established, the selection logic circuitry 18 may trigger the operation of the modules 12, 13.

The circuitries 12 to 18 may be considered as separated physical circuitries or as computer program modules executed at least partially by the same or overlapping physical resources or circuitries. It should be appreciated that the positioning circuitry 10 may comprise a subset of the sub-circuitries 12 to 18 or 12 to 17.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 11 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 11 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 11 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising: determining, by an apparatus, locations of a plurality of fixed positioning nodes;
receiving, by the apparatus, a measurement report from a mobile device, the measurement report comprising a plurality of measurement values measured by the mobile device, wherein each measurement value comprises a reference signal time difference indicating a radio propagation time difference between the mobile device and two different positioning nodes;
determining, on the basis of threshold comparison carried out by the location computer apparatus, that at least one of the plurality of measurement values is associated with an inaccurate measurement;
modifying, autonomously by the apparatus, said at least one of the plurality of measurement values; and
computing, by the apparatus, a location of the mobile device on the basis of a plurality of measurement values resulting from said modifying, wherein said threshold comparison comprises:
forming a surrounding node set for a positioning node, wherein the surrounding node set comprises a plurality of positioning nodes surrounding said positioning node, determining a measurement value comprising a reference signal time difference associated with said positioning node and another positioning node, wherein the another positioning node is not included in the surrounding node set;
determining a maximum reference signal time difference value amongst a set of measurement values, wherein the set of measurement values comprises reference signal time difference values between said another positioning node and each positioning node of the surrounding node set; if said determined measurement value is higher than the determined maximum reference signal time difference value, determining the determined measurement value to be inaccurate.

2. The method of claim 1, wherein said modifying comprises reducing the value of said determined measurement value to the determined maximum reference signal time difference value.

3. The method of claim 1, further comprising:
determining a minimum reference signal time difference value amongst a set of measurement values, wherein the set of measurement values comprises reference signal time difference values between said other positioning node and each positioning node of the surrounding node set;
if said determined measurement value is lower than the determined minimum reference signal time difference value, determining the determined measurement value to be inaccurate.

4. An apparatus comprising: at least one processor, and at least one memory comprising a computer program code, wherein the processor, the memory, and the computer program code are configured to cause the apparatus to: determine locations of a plurality of fixed positioning nodes; receive a measurement report from a mobile device, the measurement report comprising a plurality of measurement values measured by the mobile device, wherein each measurement value comprises a reference signal time difference indicating a radio propagation time difference between the mobile device and two different positioning nodes; determine, on the basis of threshold comparison carried out by the location computer apparatus, that at least one of the plurality of measurement values is associated with an inaccurate measurement; modify, autonomously, said at least one of the plurality of measurement values; and compute a location of the mobile device on the basis of a plurality of measurement values resulting from said modifying, wherein the processor, the memory, and the computer program code are configured to cause the apparatus further to: form a surrounding node set for a positioning node, wherein the surrounding node set comprises a plurality of positioning nodes surrounding said positioning node, and wherein the processor, the memory, and the computer program code are configured to cause the apparatus to carry out said threshold comparison by performing at least the following: determining a measurement value comprising a reference signal time difference associated with said positioning node and another positioning node, wherein the another positioning node is not included in the surrounding node set; determining a maximum reference signal time difference value amongst a set of measurement values, wherein the set of measurement values comprises reference signal time difference values between said another positioning node and each positioning node of the surrounding node set; if said determined measurement value is higher than the determined maximum reference signal time difference value, determining the determined measurement value to be inaccurate.

5. The apparatus of claim 4, wherein the processor, the memory, and the computer program code are configured to cause the apparatus to carry out said modifying by performing at least the following: reducing the value of said determined measurement value to the determined maximum reference signal time difference value.

6. The apparatus of claim 4, wherein the processor, the memory, and the computer program code are configured to cause the apparatus to carry out said threshold comparison by performing further at least the following:
determining a minimum reference signal time difference value amongst a set of measurement values, wherein the set of measurement values comprises reference signal time difference values between said other positioning node and each positioning node of the surrounding node set;
if said determined measurement value is lower than the determined minimum reference signal time difference value, determining the determined measurement value to be inaccurate.

7. A computer program product embodied on a non-transitory distribution medium readable by a computer and comprising program instructions which, when loaded into an apparatus, execute a method comprising: determining, by the apparatus, locations of a plurality of fixed positioning nodes; receiving, by the apparatus, a measurement report from a mobile device, the measurement report comprising a plurality of measurement values measured by the mobile device, wherein each measurement value comprises a reference signal time difference indicating a radio propagation time difference between the mobile device and two different positioning nodes; determining, on the basis of threshold comparison carried out by the location computer apparatus, that at least one of the plurality of measurement values is associated with an inaccurate measurement; modifying, autonomously by the apparatus, said at least one of the plurality of measurement values; and computing, by the apparatus, a location of the mobile device on the basis of a plurality of measurement values resulting from said modifying, wherein said threshold comparison comprises: forming a surrounding node set for a positioning node, wherein the surrounding node set comprises a plurality of positioning nodes surrounding said positioning node, determining a measurement value comprising a reference signal time difference associated with said positioning node and another positioning node, wherein the another positioning node is not included in the surrounding node set; determining a maximum reference signal time difference value amongst a set of measurement values, wherein the set of measurement values comprises reference signal time difference values between said another positioning node and each positioning node of the surrounding node set; if said determined measurement value is higher than the determined maximum reference signal time difference value, determining the determined measurement value to be inaccurate.

* * * * *